United States Patent [19]

Hirose

[11] Patent Number: 4,677,514
[45] Date of Patent: Jun. 30, 1987

[54] STRADDLE TYPE MAGNETIC HEAD

[75] Inventor: Eiichi Hirose, Niigata, Japan

[73] Assignee: Alps Electric Co., Ltd., Japan

[21] Appl. No.: 671,693

[22] Filed: Nov. 15, 1984

[30] Foreign Application Priority Data

Nov. 17, 1983 [JP] Japan .................. 58-176689[U]

[51] Int. Cl.[4] .................. G11B 5/27; G11B 5/42
[52] U.S. Cl. .................. 360/119; 360/121
[58] Field of Search .............. 360/118, 119, 121, 122

[56] References Cited

U.S. PATENT DOCUMENTS

| | | | |
|---|---|---|---|
| 3,859,663 | 1/1975 | Best et al. ................ | 360/121 |
| 3,964,103 | 6/1976 | Thompson et al. ........ | 360/129 |
| 4,100,584 | 7/1978 | Behr et al. ................ | 360/119 X |
| 4,106,173 | 8/1978 | Morokuma et al. ...... | 360/119 X |
| 4,110,804 | 9/1978 | Castrodale et al. ...... | 360/118 |
| 4,152,742 | 5/1979 | Kronfeld .................. | 360/125 |
| 4,176,384 | 11/1979 | Yang ........................ | 360/121 |
| 4,423,550 | 1/1984 | Fujioka et al. ............ | 360/118 X |
| 4,425,701 | 1/1984 | Takahashi et al. ........ | 360/121 X |
| 4,514,776 | 4/1985 | Koyama et al. .......... | 360/121 |

Primary Examiner—Stuart N. Hecker
Assistant Examiner—Alyssa H. Bowler
Attorney, Agent, or Firm—Guy W. Shoup

[57] ABSTRACT

In a magnetic head including a recording and reproducing magnetic core having a transducing gap at an intermediate position and a pair of erasing magnetic cores arranged on respective sides of the recording and reproducing magnetic core so as to straddle the same, thereby forming erasing gaps between the erasing cores and the recording and reproducing magnetic core, respectively, a difficulty of causing an excessive DC magnetic bias to be applied along the length of the transducing gap is eliminated by forming a cut-away portion on a part of surface portion of each erasing magnetic core facing a magnetic recording medium and the transducing gap.

2 Claims, 6 Drawing Figures

STRADDLE TYPE MAGNETIC HEAD

BACKGROUND OF THE INVENTION

1. Field of the Invention

This invention relates to a recording and reproducing magnetic head to be used in a magnetic disc cartridge, and more particularly to a magnetic head of a straddle type.

2. Description of the Prior Art

Ordinarily, magnetic heads are classified into two types, one being a straddle type and the other being a tunnel type. The straddle type magnetic head permits the width of its I-shaped core portion to be wider than that of the tunnel type, and hence exhibits advantageous features of providing higher magnetic properties and higher output characteristics.

FIGS. 1 and 2 illustrate a conventional magnetic head of the straddle type. The magnetic head comprises a recording and reproducing magnetic core 1 made of a magnetic material such as ferrite and formed into two pieces forming a recording and reproducing gap 1a between the leg portions 1b.

The magnetic head further comprises two erasing cores also made of a magnetic material such as ferite, and arranged on both sides of the recording and reproducing magnetic core 1. Portions 3 made of a non-magnetic material such as glass are provided in combination with the erasing cores 2, respectively. A pair of core holders 4 made of a non-magnetic material such as a ceramic and formed with grooves 4a for receiving the erasing cores 2, respectively, are arranged on both sides of the recording and reproducing magnetic core 1 together with the erasing cores 2 in an opposite relation.

FIG. 2 illustrates, in a plan view, the arrangement when the members are assembled into the magnetic head. During the assembling, the erasing cores 2 are positioned with respect to the recording and reproducing magnetic core 1 so that erasing gaps 2a of a predetermined distance are maintained between the erasing cores 2 and the recording and reproducing magnetic core 1. After positioning of the erasing cores 2, the erasing cores 2 are secured in these positions by the use of a binding material such as glass.

The straddle type magnetic head ordinarily utilizes the recording and reproducing magnetic core 1 as one part of the erasing magnetic circuit. However, in the conventional magnetic head, the position of the recording and reproducing magnetic core 1 has been so selected that the recording and reproducing gap 1a opposes the central parts of the erasing cores 2 as shown in FIG. 2. As a consequence, a DC bias is caused by the erasing magnetic circuit to be applied between the right and left parts of the recording and reproducing magnetic core 1 through the recording and reproducing gap 1a, thus causing a peak shift upon generation of high frequency components. This tendency becomes conspicuous during a narrow track operation, and makes it difficult to operate the magnetic head in the narrow track and high-density recording state.

SUMMARY OF THE INVENTION

An object of the present invention is to provide a magnetic head wherein the above described difficulties of the conventional magnetic head can be substantially eliminated.

Another object of the invention is to provide a magnetic head wherein the occurrence of the peak shift can be prevented, and narrow track, high-density operations are thereby made possible.

These and other objects of the present invention can be achieved by a magnetic head comprising a recording and reproducing magnetic core having a recording and reproducing gap at an intermediate position of the magnetic core, and a pair of erasing magnetic cores arranged on both sides of the recording and reproducing magnetic core so as to straddle the same, while erasing gaps are formed between the erasing magnetic cores and the recording and reproducing magnetic core, respectively. The recording and reproducing magnetic core is utilized as one part of an erasing magnetic circuit, and a cut-away portion is provided for each of the erasing magnetic cores on a surface facing a magnetic recording medium and on a surface opposing to the recording and reproducing gap.

DESCRIPTION OF THE PREFERRED EMBODIMENTS

Figure 1:
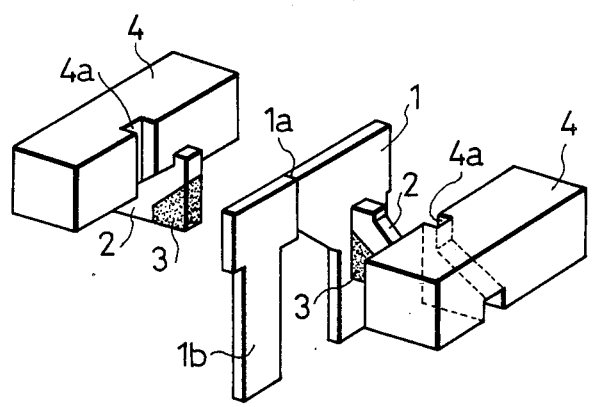
FIG. 1 is an exploded perspective view of a conventional magnetic head.
Figure 2:
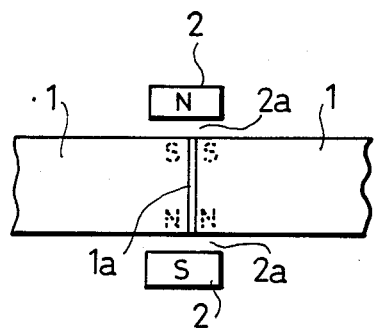
FIG. 2 is a plan view generally showing an important part of the conventional magnetic head.

The preferred embodiments of the present invention will now be described in detail with reference to FIGS. 3 through 6 wherein similar members as those in FIGS. 1 and 2 are designated by similar reference numerals.

The constructions of the preferred embodiments of the invention are quite similar to that of the conventional magnetic head shown in FIGS. 1 and 2 except that a cut-away portion 6a or 6b is provided on a surface 5a opposing to the magnetic recording medium or on a surface 5b opposing to the recording and reproducing gap, of the erasing magnetic cores 2.

Figure 3:
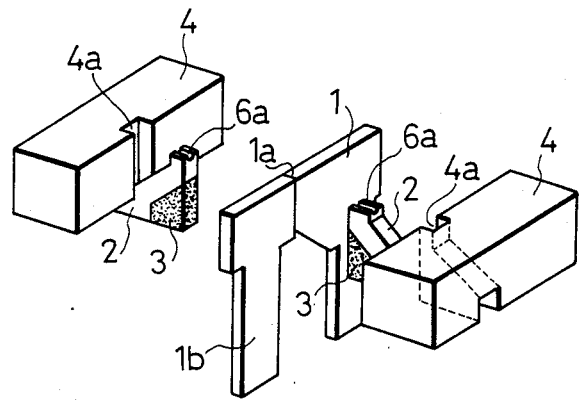
FIG. 3 is an exploded perspective view of a magnetic head according to the present invention.
Figure 4:
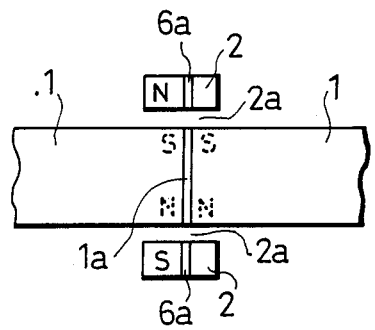
FIG. 4 is a plan view generally showing an important part of the magnetic head of this invention.
Figure 5:
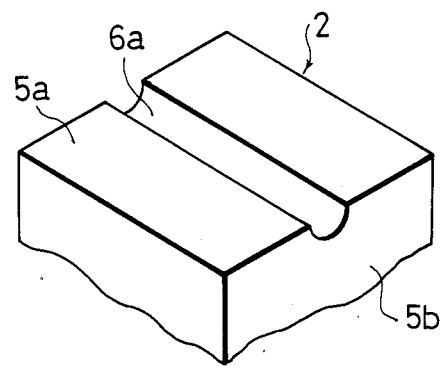
FIGS. 5 and 6 are enlarged perspective views of erasing magnetic cores.

More specifically, in the embodiment shown in FIGS. 3, 4 and 5, a groove 6a having a width wider than that of the recording and reproducing gap 1a is formed on the surface 5a opposing to the magnetic recording medium, of each erasing magnetic core 2 so as to extend onto the surface 5b opposing to the recording and reproducing gap 1a, of the same erasing magnetic core 2. Because of the provision of the groove 6a of such a width, the magnetic field affecting the recording and, reproducing gap 1a is reduced, thereby reducing the DC bias and preventing the occurrence of the peak shift.

Figure 6:
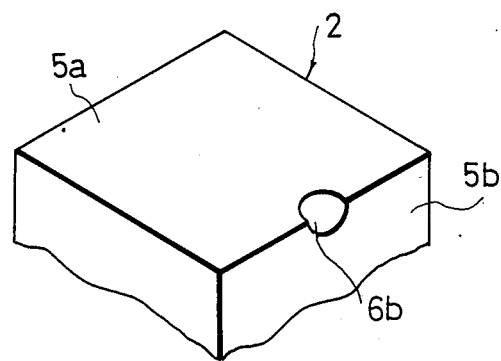

FIG. 6 illustrates another embodiment wherein, instead of the above described groove 6a, a recess 6b of a similar width as that of the groove 6a is provided to extend on the surfaces 5a and 5b of each erasing magnetic core 2, opposing to the recording medium and the recording and reproducing gap 1a, respectively.

According to the present invention, since a cut-away portion is provided to extend over the surfaces of each erasing magnetic core, opposing to the magnetic recording medium and the recording and reproducing gap, respectively, there is no possibility of an excessive amount of the DC bias being applied between the portions of the recording and reproducing magnetic core through the recording and reproducing gap, and advantageous effects such as preventing the peak shift, improving the magnetic property, and enabling the narrow track and high density recording operation can be thereby realized.

What is claimed is:

1. In a straddle type magnetic head, for recording on and reproducing from a magnetic recording medium, comprising a recording and reproducing magnetic core having a recording and reproducing gap of a predetermined width formed at an intermediate position of said magnetic core on one surface thereof facing the recording medium, and a pair of erasing magnetic cores arranged on each side of the recording and reproducing magnetic core so as to straddle the same at the intermediate position of said gap, whereby erasing gaps are formed between the erasing magnetic cores and the recording and reproducing magnetic core, respectively, and the recording and reproducing magnetic core is utilized as one part of an erasing magnetic circuit, the improvement wherein said erasing magnetic cores each has one surface thereof facing the recording medium and a recess which is formed in said surface aligned with said recording and reproducing gap and having a width wider than the width of said gap, such that a DC bias due to the erasing magnetic circuit and a peak shift due to generation of high frequency components are substantially prevented, wherein said recess is a groove extending across said one surface of each of said erasing magnetic core.

2. A straddle type magnetic head according to claim 1, wherein said recess extends from said one surface to an adjoining surface of each of said erasing magnetic cores facing across from said recording and reproducing gap.

* * * * *